(12) United States Patent
Baldascini et al.

(10) Patent No.: US 7,258,033 B2
(45) Date of Patent: Aug. 21, 2007

(54) DOUBLE CLUTCH TRANSMISSION FOR MOTOR VEHICLES

(75) Inventors: Filippo Baldascini, Orbassano (IT); Dario Caenazzo, Orbassano (IT); Domenico Mesiti, Orbassano (IT); Gianluigi Pregnolato, Orbassano (IT)

(73) Assignee: CRF Societa Consortile Per Azioni, Orbassano (Torino) (IT)

( * ) Notice: Subject to any disclaimer, the term of this patent is extended or adjusted under 35 U.S.C. 154(b) by 200 days.

(21) Appl. No.: 11/111,947

(22) Filed: Apr. 22, 2005

(65) Prior Publication Data

US 2005/0241424 A1 Nov. 3, 2005

(30) Foreign Application Priority Data

Apr. 23, 2004 (EP) .................. 04425283

(51) Int. Cl.
*F16H 3/08* (2006.01)
(52) U.S. Cl. ........................................ 74/331
(58) Field of Classification Search ............... 74/331, 74/330
See application file for complete search history.

(56) References Cited

U.S. PATENT DOCUMENTS

| | | | |
|---|---|---|---|
| 4,461,188 A | 7/1984 | Fisher | |
| 5,311,789 A | 5/1994 | Henzler et al. | |
| 2006/0005649 A1* | 1/2006 | Baldascini et al. | 74/335 |
| 2006/0278028 A1* | 12/2006 | Caenazzo et al. | 74/331 |

FOREIGN PATENT DOCUMENTS

| | | |
|---|---|---|
| EP | 1 067 312 A1 | 1/2001 |
| EP | 1 077 336 A1 | 2/2001 |
| EP | 1 077 336 B1 | 2/2001 |
| EP | 1 245 863 A2 | 10/2002 |
| FR | 2 802 600 A1 | 6/2001 |
| IT | TO2001A000286 | 3/2001 |

* cited by examiner

*Primary Examiner*—Dirk Wright
(74) *Attorney, Agent, or Firm*—Sughrue Mion, PLLC

(57) ABSTRACT

The transmission comprises: a first input shaft carrying first, second and third driving gearwheels associated to odd gears and to a reverse gear; a second input shaft made in the form of a hollow shaft coaxial with the first input shaft and carrying fourth and fifth driving gearwheels associated to even gears; a first friction clutch for coupling the first input shaft to a driving shaft of the vehicle; a second friction clutch for coupling the second input shaft to the driving shaft; a first output shaft arranged parallel to the first and second input shafts and carrying a first idle driven gearwheel meshing with the first driving gearwheel for providing a first gear, a second idle driven gearwheel meshing with the second driving gearwheel for providing a third gear and a third idle driven gearwheel meshing with the fifth driving gearwheel for providing a sixth gear, as well as a first engagement sleeve for selectively engaging the first or the third gear and a second engagement sleeve for engaging the sixth gear; and a second output shaft arranged parallel to the first and second input shafts and carrying a fourth idle driven gearwheel meshing with the first idle driven gearwheel for providing the reverse gear, a fifth idle driven gearwheel meshing with the third driving gearwheel for providing a fifth gear, a sixth idle driven gearwheel meshing with the fourth driving gearwheel for providing a second gear, and a seventh idle driven gearwheel meshing with the fifth driving gearwheel for providing a fourth gear, as well as a third engagement sleeve for selectively engaging the reverse gear or the fifth gear and a fourth engagement sleeve for selectively engaging the second or the fourth gear.

7 Claims, 3 Drawing Sheets

DOUBLE CLUTCH TRANSMISSION FOR MOTOR VEHICLES

BACKGROUND OF THE INVENTION

The present invention relates to a double clutch transmission for motor vehicles, with six or seven gears.

A six-gear double clutch transmission for motor vehicles is known from Italian patent application No. TO2001A000286 in the name of the applicant. This known arrangement enables all the gear changes to be made in the so-called power-shift mode, that is to say, with controlled transfer of power and torque between the two friction clutches.

The above-mentioned double clutch transmission for motor vehicles suffers from the disadvantage of having a different structure from that of ordinary single clutch transmissions, whether manual or robotized. Therefore, this double clutch transmission cannot be easily produced from the associated single clutch transmission but requires dedicated production systems, with a consequent increase in manufacturing costs.

A further example of a six-gear double clutch transmission for motor vehicles is known from FR 2 802 600. According to this known arrangement, the transmission comprises:

- a first input shaft carrying a driving gearwheel associated to both the first gear and the reverse gear, a driving gearwheel associated to the third gear and a driving gearwheel associated to the fifth gear,
- a second input shaft made in the form of a hollow shaft coaxial with the first and carrying a driving gearwheel associated to the second gear and a driving gearwheel associated to both the fourth gear and the sixth gear,
- a first output shaft carrying driven gearwheels of first, third, fifth and sixth gear, as well as a first engagement sleeve for selectively engaging the first or the third gear and a second engagement sleeve for selectively engaging the fifth or the sixth gear, and
- a second output shaft carrying driven gearwheels of reverse, second and fourth gear, as well as a third engagement sleeve for engaging the reverse gear and a fourth engagement sleeve for selectively engaging the second or the fourth gear.

Also this arrangement does not allow shifting between the fifth and the sixth gear in power-shift mode. However, this limitation does not adversely affect the driving comfort, since the jerk occurring in the vehicle upon shifting between the two highest gears is contained and therefore scarcely noticeable by the driver.

On the other hand, this known architecture is not well suitable for a seven-gear double clutch transmission. In fact, switching from a six-gear to a seven-gear transmission while retaining the advantage of enabling all the gear changes to be made in the power-shift mode, except for that between the two highest gears, would involve an increase in the axial size of the transmission, since the driven gearwheel of seventh gear could not be placed on the second output shaft in the free space between the driven gearwheels of reverse and second gear but should be placed on the first output shaft next to the driven gearwheel of sixth gear.

SUMMARY OF THE INVENTION

It is therefore the object of the present invention to provide a double clutch transmission for motor vehicles, which can be switched from the six-gear to the seventh-speed configuration with no increase in the overall axial size of the transmission, and which have a high level of synergy between the double clutch configuration and the corresponding single clutch configuration, whether manual or robotized, thereby reducing the manufacturing costs.

These and other objects are achieved according to the invention by a double clutch transmission for motor vehicles having the characteristics specified in the attached claims.

As will be made clear by the following description, a transmission according to the invention makes it possible to maximize the number of components in common with the single clutch configuration, whether manual or robotized, and the corresponding double clutch configuration, and to minimize the number of modifications required for switching from one configuration to the other. Both the single clutch and double clutch configurations of the transmission can thus be manufactured on the same production line, and therefore at lower cost.

Additionally, a transmission according to the invention offers high flexibility of configuration, since it allows the production of either a very compact and inexpensive manual version or a more sophisticated double clutch version with six or seven gears.

Another advantage is given by the reduction in the overall axial size of the transmission. A further advantage is the reduction of the number of driving gearwheels, owing to the sharing of some gears. In particular, the sharing of the reverse gear enables the reverse gear shaft to be dispensed with.

BRIEF DESCRIPTION OF THE DRAWINGS

Further characteristics and advantages of the invention will be made clear by the following detailed description, provided purely by way of non-limitative example, with reference to the attached drawings, in which.

The gear trains corresponding to the different forward gears of the transmission are indicated in the figures by Roman numerals I, II, III, IV, V, VI and VII, for the first, the second, the third, the fourth, the fifth, the sixth and the seventh gear, respectively, while the reverse gear is indicated by letter R.

DESCRIPTION OF PREFERRED EMBODIMENTS

Figure 1:
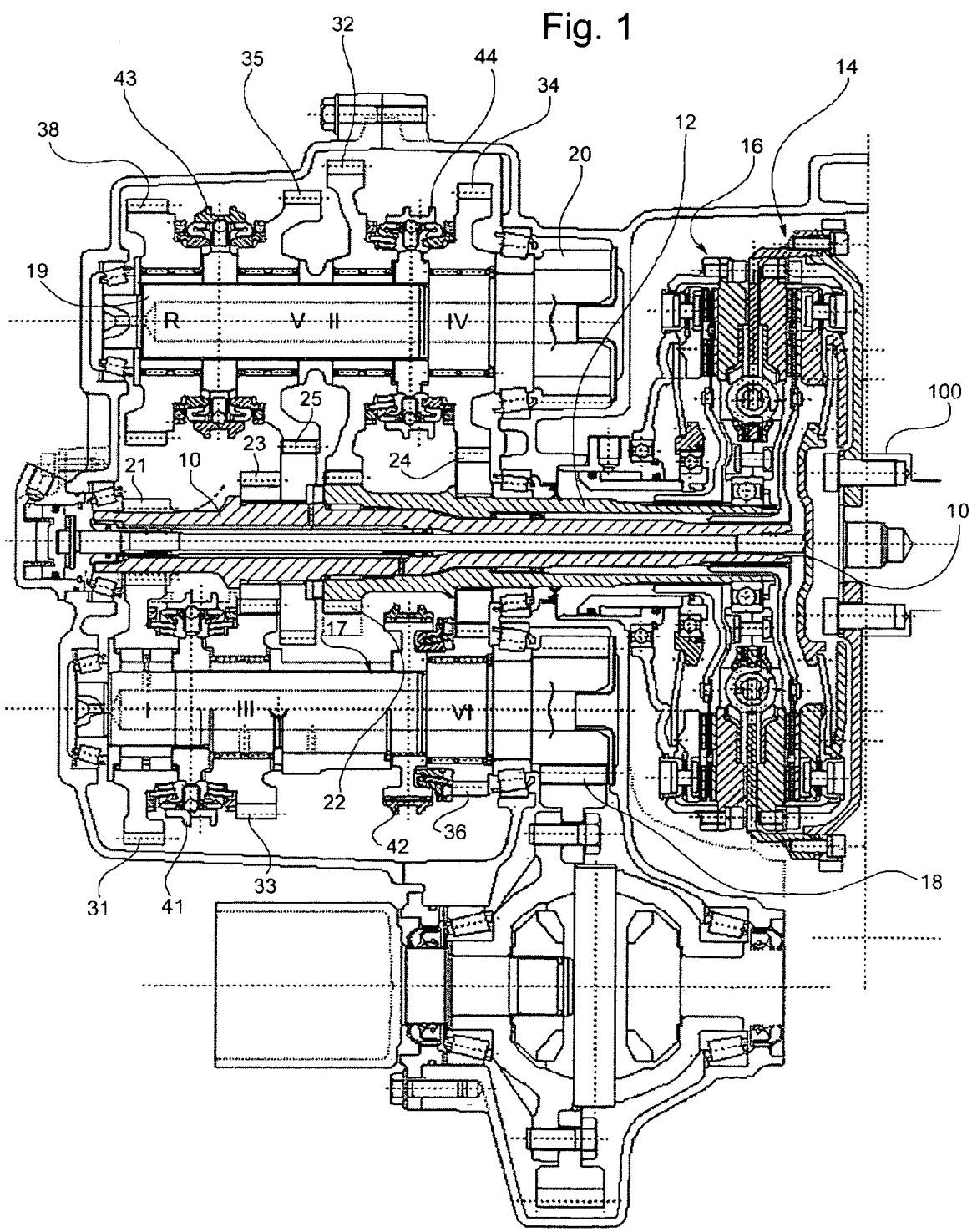
FIG. 1 shows an axial section of a six-gear double clutch transmission for motor vehicles according to the present invention.

With reference first to FIG. 1, a six-gear double clutch transmission for motor vehicles according to a preferred embodiment of the invention basically comprises:

- a first input shaft 10;
- a second input shaft 12, coaxial with the first input shaft 10 and made in the form of a hollow shaft in which is inserted a portion of the first input shaft 10 facing the engine of the motor vehicle (not shown);
- a first normally-engaged friction clutch, generally indicated 14, for coupling the first input shaft 10 to a driving shaft 100 (of which only an end portion is shown);
- a second normally-disengaged friction clutch, generally indicated 16, for coupling the second input shaft 12 to the driving shaft 100;

a first output shaft 17 arranged parallel to the two input shafts 10 and 12 and carrying a first final reduction pinion 18; and a second output shaft 19 arranged parallel to the two input shafts 10 and 12 and carrying a second final reduction pinion 20.

The first input shaft 10 carries, from left to right, that is from the side opposite the engine and the friction clutches 14 and 16 to the side facing the engine and the friction clutches 14 and 16, a driving gearwheel 21 of first gear, preferably formed in this embodiment as a ring gear integral with the shaft 10, a driving gearwheel 23 of third gear and a driving gearwheel 25 of fifth gear. All the driving gearwheels 21, 23 and 25 are fast for rotation with the associated first input shaft 10.

The second input shaft 12 carries, from left to right, a driving gearwheel 22 of second gear, preferably formed in this embodiment as a ring gear integral with the shaft 12, and a driving gear wheel 24 of fourth and sixth gear. Both the driving gearwheels 22 and 24 are fast for rotation with the associated second input shaft 12.

The first output shaft 17 carries, from left to right, a driven gearwheel 31 of first gear, permanently meshing with the driving gearwheel 21 carried by the first input shaft 10, a driven gearwheel 33 of third gear, permanently meshing with the driving gearwheel 23 carried by the first input shaft 10, and a driven gearwheel 36 of sixth gear, permanently meshing with the driving gearwheel 24 carried by the second input shaft 12. All the driven gearwheels 31, 33 and 36 are idly mounted on the first output shaft 17 and can be coupled for rotation therewith by means of a pair of first and second engagement sleeves 41 and 42. Specifically, the first engagement sleeve 41 is mounted between the two driven gearwheels 31 and 33 and is selectively movable to the left or to the right to engage the first or the third gear, respectively, while the second engagement sleeve 42 is mounted next to the driven gearwheel 36 and is movable to the right to engage the sixth gear.

The second output shaft 19 carries, from left to right, a driven gearwheel 38 of reverse gear, permanently meshing with the idle gearwheel 31 carried by the first output shaft 17, a driven gearwheel 35 of fifth gear, permanently meshing with the driving gearwheel 25 carried by the first input shaft 10, a driven gearwheel 32 of second gear, permanently meshing with the driving gearwheel 22 carried by the second input shaft 12, and a driven gearwheel 34 of fourth gear, permanently meshing with the driving gearwheel 24 carried by the second input shaft 12. All the driven gearwheels 38, 35, 32 and 34 are idly mounted on the second output shaft 19 and can be coupled for rotation therewith by means of a pair of third and fourth engagement sleeves 43 and 44. Specifically, the third engagement sleeve 43 is mounted between the two driven gearwheels 38 and 35 and is selectively movable to the left or to the right to engage the reverse or the fifth gear, respectively, while the fourth engagement sleeve 44 is mounted between the two driven gearwheels 32 and 34 and is selectively movable to the left or to the right to engage the second or the fourth gear, respectively.

Since the gear trains of first and reverse gear share the same driving gearwheel, namely the gearwheel 21 carried by the first input shaft 10, this embodiment makes it possible to dispense with a lay shaft for the reverse gear. Moreover, since also the gear trains of fourth and sixth gear share the same driving gearwheel, namely the gearwheel 24 carried by the second input shaft 12, the overall axial size of the transmission is reduced.

Additionally, it can be noted that the gear trains of fourth and sixth gear are positioned on the side of the transmission facing the engine and the friction clutches 14 and 16, while the gear trains of first and reverse gear are positioned on the axially opposite side. This arrangement makes it easier to switch the transmission from the double clutch version to the single clutch one and vice versa.

Another advantage of the transmission is that all the sequential gear changes can be made in power-shift mode.

Preferably, this embodiment provides for the use of identical final reduction pinions 18 and 20, with different centre distances between the two output shafts 17 and 19 and the axis of the two input shafts 10 and 12.

Preferably, the two friction clutches 14 and 16 are of the dry type, in order to maximize the efficiency of the transmission.

Additionally, due to the use of the normally-engaged friction clutch 14 for the first input shaft 10 carrying the driving gearwheel 21 of first and reverse gear, it is possible to dispense with a parking device, by contrast with a solution having both of the friction clutches of the normally-disengaged type. Since the other friction clutch 16 is normally disengaged, problems (breakage of the gearbox and/or hazards to the user) are also avoided which might arise in case of a failure (electrical, electronic and/or hydraulic fault) in the course of a gear change which requires the simultaneous engagement of two gears, without the need to adopt an appropriate safety system which is rather necessary in transmissions in which both of the friction clutches are of the normally-engaged type.

Figure 2:
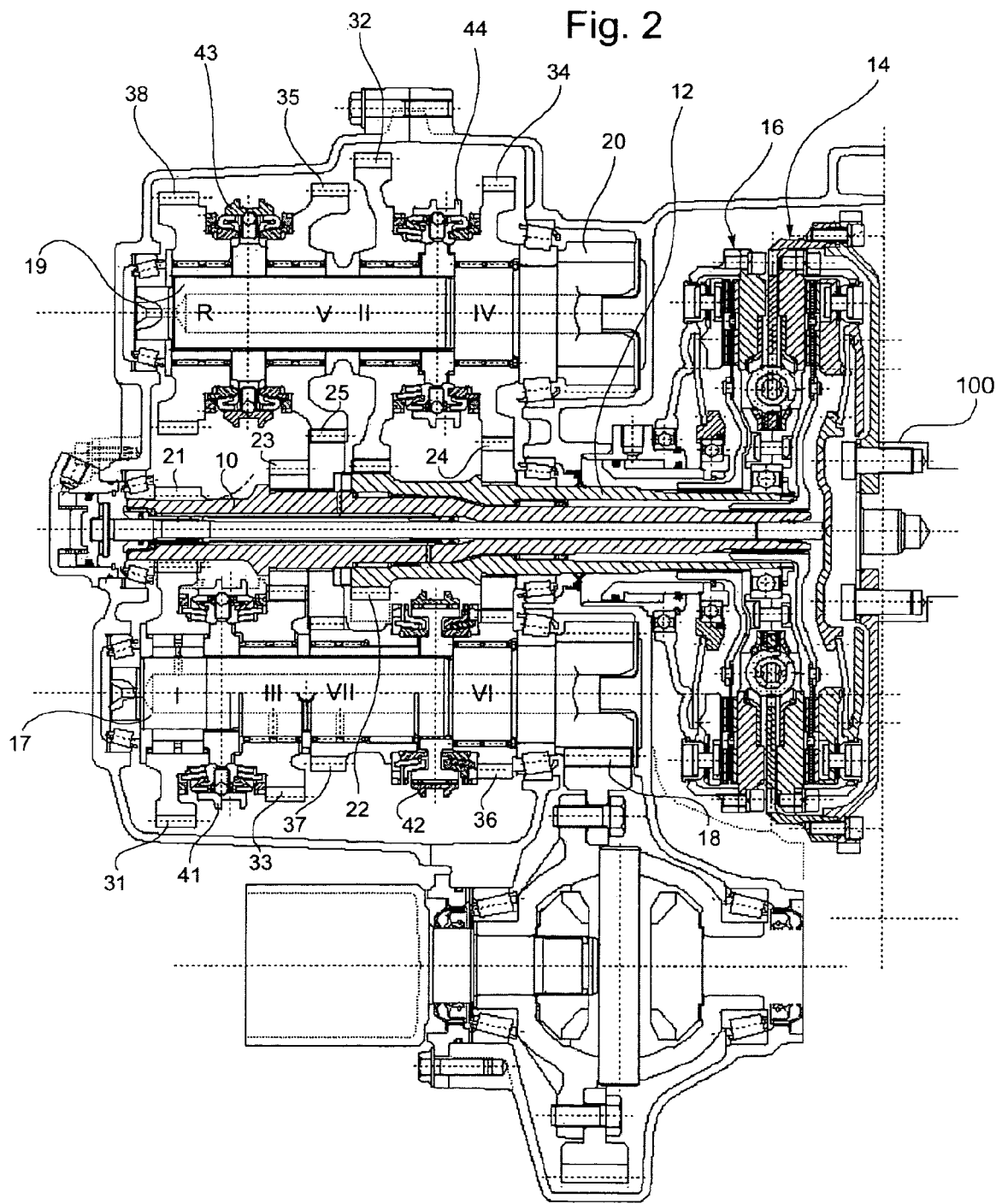
FIG. 2 shows an axial section of a seven-gear double clutch transmission for motor vehicles according to the present invention.

A seven-gear double clutch transmission for a motor vehicle according to a preferred embodiment of the invention is shown in FIG. 2, where parts and elements identical or corresponding to those of FIG. 1 have been given the same reference numbers.

The embodiment of FIG. 2 shares the same arrangement of the gears as that of FIG. 1, from which it is derived simply by adding a driven gearwheel 37 of seventh gear, which is idly mounted on the first output shaft 17 between the driven gearwheels 33 and 36 of third and sixth gear, respectively, and meshes permanently with the driving gearwheel 25 of fifth gear. In this case, the second engagement sleeve 42 is mounted between the two driven gearwheels 37 and 36 and is selectively movable to the left or to the right to engage the seventh or the sixth gear, respectively.

As in the embodiment of FIG. 1, the two output shafts 17 and 19 advantageously carry final reduction pinions 18 and 20 with identical numbers of teeth.

Since the gear trains of first and reverse gear, of fourth and sixth gear, and of fifth and seventh gear are shared, a seven-gear transmission is achieved which has approximately the same overall axial size as the six-gear transmission of FIG. 1.

Moreover, all the sequential gear changes can be made in power-shift mode, except for that between the sixth and the seventh gear. As already stated above, this limitation is however not particularly significant in terms of driving comfort.

Another advantage of a seven-gear transmission of this type is that its total range is close to that of a continuously variable transmission, with an unchanged overall efficiency (typical of that of an ordinary discrete gearbox) and a considerable simplification in the control system.

Furthermore, since the seventh gear is operated by an input shaft (that is to say, the first input shaft 10) associated with a normally-engaged friction clutch (that is to say, the first clutch 14), there is no need to keep this friction clutch energized when the vehicle is running on a motorway with the seventh gear engaged, which improves energy efficiency.

Figure 3:
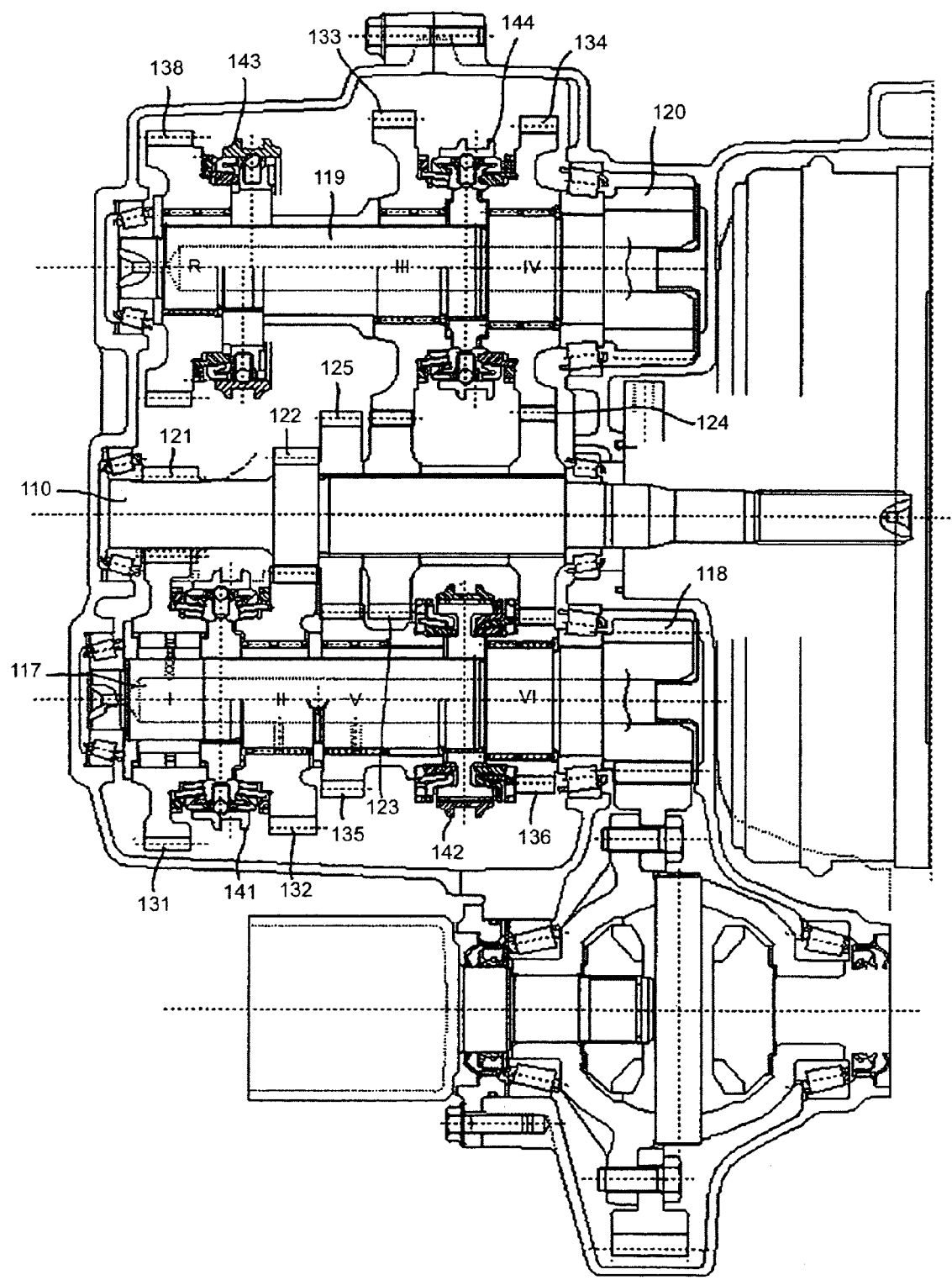
FIG. 3 shows an axial section of a manual six-gear single clutch transmission for motor vehicles which can be obtained from the transmissions of FIG. 1.

Finally, an example of a manual six-gear single clutch transmission for motor vehicles which can be obtained from the double clutch transmission of FIG. 1 is shown in FIG. 3, where parts and elements identical or corresponding to those of FIG. 1 have been given the same reference numbers, increased by 100.

The manual single clutch transmission of FIG. 3 is derived from the double clutch transmission of FIG. 1 simply by joining the two coaxial input shafts, by inverting the order of the gear trains of second and third gear and by moving the driven gearwheel of fifth gear from the one output shaft to the other.

The single clutch transmission of FIG. 3 has therefore:
- a single input shaft 110 carrying, from left to right, a driving gearwheel 121 of first and reverse gear, a driving gearwheel 122 of second gear, a driving gearwheel 125 of fifth gear, a driving gearwheel 123 of third gear, a driving gear wheel 124 of fourth and sixth gear, all the driving gearwheels 121-125 being fast for rotation with the input shaft 110;
- a single friction clutch (not shown) for coupling the input shaft 110 to the driving shaft of the vehicle (also not shown);
- a first output shaft 117 arranged parallel to the input shaft 110 and carrying, from left to right, a driven gearwheel 131 of first gear, permanently meshing with the driving gearwheel 121, a driven gearwheel 132 of second gear, permanently meshing with the driving gearwheel 122, a driven gearwheel 135 of fifth gear, permanently meshing with the driving gearwheel 125, a driven gearwheel 136 of sixth gear, permanently meshing with the driving gearwheel 124, and a first final reduction pinion 118; and
- a second output shaft 119 arranged parallel to the input shaft 110 and carrying, from left to right, a driven gearwheel 138 of reverse gear, permanently meshing with the idle gearwheel 131 carried by the first output shaft 117, a driven gearwheel 133 of third gear, permanently meshing with the driving gearwheel 123, a driven gearwheel 134 of fourth gear, permanently meshing with the driving gearwheel 124, and a second final reduction pinion 120, preferably identical to the first final reduction pinion 118.

All the driven gearwheels 131, 132, 135 and 136 mounted on the first output shaft 117 are idle gearwheels, which can be coupled for rotation with this shaft by means of a pair of first and second engagement sleeves 141 and 142. Specifically, the first engagement sleeve 141 is mounted between the two driven gearwheels 131 and 132 and is selectively movable to the left or to the right to engage the first or the second gear, respectively, while the second engagement sleeve 142 is mounted between the two driven gearwheels 135 and 136 and is selectively movable to the left or to the right to engage the fifth or the sixth gear, respectively.

Similarly, all the driven gearwheels 138, 133 and 134 mounted on the second output shaft 119 are idle gearwheels, which can be coupled for rotation with this shaft by means of a pair of third and fourth engagement sleeves 143 and 144. Specifically, the third engagement sleeve 143 is mounted next to the driven gearwheel 138 and is movable to the left to engage the reverse gear, while the fourth engagement sleeve 144 is mounted between the two driven gearwheels 133 and 134 and is selectively movable to the left or to the right to engage the third or the fourth gear, respectively.

As can be noted by comparing the arrangements of FIGS. 1 to 3, the output shafts of the single clutch transmission of FIG. 3 are identical to those of the double clutch transmissions of FIGS. 1 and 2, which helps to reduce the manufacturing costs of this family of transmissions.

Moreover, a robotized variant (not shown) of the six-gear single clutch transmission of FIG. 3 can be obtained from the six-gear double clutch transmission of FIG. 1 simply by joining the two input shafts. Similarly, a robotized seven-gear single clutch transmission (also not shown) can be obtained from the seven-gear double clutch transmission of FIG. 2 simply by joining the two input shafts.

Naturally, the principle of the invention remaining unchanged, embodiments and manufacturing details may vary widely from those described and illustrated purely by way of non-limiting example.

What is claimed is:

1. A double clutch transmission for motor vehicles, comprising:
    a first input shaft carrying first, second and third driving gearwheels associated to odd gears and to a reverse gear;
    a second input shaft made in the form of a hollow shaft coaxial with the first input shaft and carrying fourth and fifth driving gearwheels associated to even gears;
    a first friction clutch for coupling the first input shaft to a driving shaft of the vehicle;
    a second friction clutch for coupling the second input shaft to the driving shaft;
    a first output shaft arranged parallel to the first and second input shafts and carrying a first idle driven gearwheel permanently meshing with the first driving gearwheel for providing a first gear, a second idle driven gearwheel permanently meshing with the second driving gearwheel for providing a third gear and a third idle driven gearwheel permanently meshing with the fifth driving gearwheel for providing a sixth gear, as well as a first engagement sleeve for selectively engaging the first or the third gear and a second engagement sleeve for engaging the sixth gear; and
    a second output shaft arranged parallel to the first and second input shafts and carrying a fourth idle driven gearwheel permanently meshing with the first idle driven gearwheel for providing the reverse gear, a fifth idle driven gearwheel permanently meshing with the third driving gearwheel for providing a fifth gear, a sixth idle driven gearwheel permanently meshing with the fourth driving gearwheel for providing a second gear, and a seventh idle driven gearwheel permanently meshing with the fifth driving gearwheel for providing a fourth gear, as well as a third engagement sleeve for selectively engaging the reverse gear or the fifth gear and a fourth engagement sleeve for selectively engaging the second or the fourth gear.

2. A transmission according to claim 1, wherein the fifth driving gearwheel is arranged on the side of the transmission facing the friction clutches, while the first driving gearwheel is arranged on the axially opposite side of the transmission.

3. A transmission according to claim 1, wherein the first output shaft further carries an eighth idle driven gearwheel interposed between the second and third driven gearwheels for providing a seventh gear.

4. A transmission according to claim 3, wherein the eighth driven gearwheel permanently meshes with the third driving gearwheel.

5. A transmission according to claim 3, wherein the second engagement sleeve is arranged selectively to engage the seventh or the sixth gear.

6. A transmission according to claim 1, wherein the first friction clutch is normally engaged, while the second friction clutch is normally disengaged.

7. A transmission according to claim 1, wherein both the first and second friction clutches are dry friction clutches.

* * * * *